(12) United States Patent
Lowe et al.

(10) Patent No.: US 8,438,237 B2
(45) Date of Patent: May 7, 2013

(54) SHARING OF ACCESS TO A STORAGE DEVICE

(75) Inventors: Chris Lowe, Cambridgeshire (GB); Harith Hamed Haboubi, Cambridge (GB); James Collier, Cambridge (GB)

(73) Assignee: Cambridge Silicon Radio Ltd., Cambridge (GB)

( * ) Notice: Subject to any disclaimer, the term of this patent is extended or adjusted under 35 U.S.C. 154(b) by 318 days.

(21) Appl. No.: 12/922,488

(22) PCT Filed: Mar. 13, 2009

(86) PCT No.: PCT/GB2009/000689
§ 371 (c)(1),
(2), (4) Date: Nov. 30, 2010

(87) PCT Pub. No.: WO2009/115777
PCT Pub. Date: Sep. 24, 2009

(65) Prior Publication Data
US 2011/0078275 A1 Mar. 31, 2011

(30) Foreign Application Priority Data
Mar. 20, 2008 (GB) .................................. 0805220.1

(51) Int. Cl.
*G06F 15/16* (2006.01)

(52) U.S. Cl.
USPC .......................................... 709/216; 710/240

(58) Field of Classification Search .......... 709/213–216; 710/200, 240, 242
See application file for complete search history.

(56) References Cited

U.S. PATENT DOCUMENTS

| 5,410,652 | A | 4/1995 | Leach et al. | |
|---|---|---|---|---|
| 6,097,943 | A * | 8/2000 | Nordwall | 455/418 |
| 6,460,101 | B1 | 10/2002 | Arimilli | |
| 6,934,794 | B2 * | 8/2005 | Garritsen et al. | 711/103 |
| 2004/0137944 | A1 * | 7/2004 | Lee et al. | 455/557 |

FOREIGN PATENT DOCUMENTS
EP 1069734 A 1/2001

* cited by examiner

*Primary Examiner* — Moustafa M Meky
(74) *Attorney, Agent, or Firm* — Fulbright & Jaworski L.L.P.

(57) ABSTRACT

A method and system for sharing access to a storage device. Two processing devices are connected to a storage device interface. The processing devices are interconnected to allow communication with regard to access to the storage device interface. Access to the storage device interface is controlled by the first and second processing devices exchanging signals. Embodiments of the invention may be a mobile device configured to play audio files from a memory card connected to the mobile device. A communications link may be established to a remote device for the transfer of data between devices.

13 Claims, 4 Drawing Sheets

SHARING OF ACCESS TO A STORAGE DEVICE

TECHNICAL FIELD

The present invention relates to sharing storage devices between more than one access device. It is particularly related to, but in no way limited to, sharing one solid state storage device between two processing devices.

BACKGROUND

Mobile devices are commercially available having hardware interfaces for connection to storage devices. Those storage devices can be used to store, for example, images or encoded audio data, for access and processing by the mobile device.

Mobile devices, for example mobile telephones, comprise a host processor which performs a number of tasks, for example managing wireless connections, providing a user interface and providing processing capacity for applications running on the mobile device. The host processor also interfaces with the storage device via an interface to access and/or store data on that device.

The host processor performs a number of functions, and is not therefore optimised for power consumption when performing any particular task. For example, decoding audio files utilising the host processor of a mobile telephone may drain the battery in a small number of hours.

Digital Signal Processors (DSPs) can be optimised for a specific task, and that optimisation very significantly reduces the power consumption for performing that task. The inclusion of a specific DSP for audio decoding in a mobile device may therefore lead to a significant increase in battery life when playing audio files. However, in order for the DSP to play audio files from a storage device, the DSP must access that storage device. During play-back, the host processor will still require access to the storage device and so a means to share the storage device between the two processors is required. If a DSP is utilised for performing certain tasks in a mobile device, it may also require the ability to write data to the storage device to perform its function.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of sharing access to a storage device interface performed in a mobile device comprising first and second processing devices and the storage device interface, the method comprising the steps of transmitting a signal from the second processing device to the first processing device indicating that the first processing device may access the storage device interface, on receipt of the signal the first processing device accessing the storage device interface, and when the first processing device has completed accessing the storage device interface, transmitting a signal from the first processing device to the second processing device indicating that the second processing device may access the storage device interface.

The method may further comprise the step of transmitting a signal from the first processing device to the second processing device indicating that the first processing device requires access to the storage device interface.

The first processing device may be a digital signal processor and the second processing device may be a host processor.

The storage device interface may be an SD card interface.

The method may be performed during retrieval and playback of an encoded audio file located on a storage device connected to the storage device interface.

The method may further comprise the step of transmitting a signal from the second processing device to the first processing device indicating that the storage device interface is not currently available to the first processing device.

Accessing may comprise reading data from the storage device interface, and wherein the method may further comprise the step of the first processing device transmitting the read data via a communications link to a remote device.

Accessing may comprise writing to the storage device interface, and wherein the method may further comprise the step of the first processing device receiving data for writing to the storage device interface via a communications link to a remote device.

The communications link may be established directly between the first processing device and the remote device.

The signal from the second processing device to the first processing device indicating that the first processing device may access the storage device interface may comprise an instruction to the first processing device to read data from the storage device interface and transmit it via the communications link.

The signal from the second processing device to the first processing device indicating that the first processing device may access the storage device interface may comprise an instruction to the first processing device to receive data via the communications link and to write that data to the storage device interface.

The method may further comprise transmitting an indication from the second processing device to the first processing device of a memory location in a storage device connected to the storage device interface which should be accessed by the first processing device.

There is also provided a mobile device, comprising first and second processing devices, a storage device interface connected to the first and second processing devices, the first and second processing devices being connected to exchange signals to control access to the storage device interface.

The first processing device may be a digital signal processor and the second processing device may be a host processor.

The storage device interface may be an SD card interface.

The first processing device may be a connectivity device for establishing a communications link with a remote device.

The first processing device may be configured to read data from the storage device interface and transmit that data to the remote device via the communications link.

The first processing device may be configured to receive data via the communications link and to write that data to the storage device interface.

An address in a storage device connected to the storage device interface for reading or writing may be specified by the second processing device.

The methods described herein may be performed by firmware or software in machine readable form on a storage medium. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
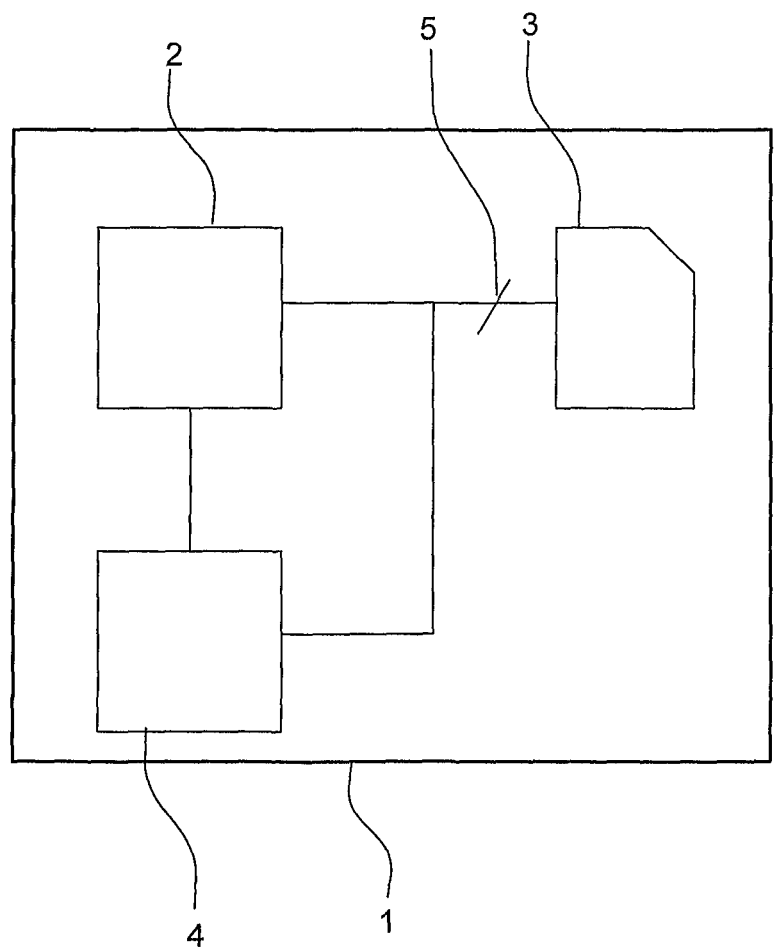
FIG. 1 is a schematic diagram of an apparatus for providing shared access to a storage device interface.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a block diagram of a mobile device 1. A host processor 2 and a Digital Signal Processor 4 (DSP) are connected to allow communications between those devices. Both the host processor 2 and the DSP 4 are connected to a storage device interface 5. The storage device interface provides access to a storage device 3, for example a removable mass storage device. The host processor 2 and DSP 4 can access data stored on the storage device 3 via the storage device interface and the connection between the host processor 2 and the DSP 4 allows those devices to communicate information with regard to access to the storage device 3.

Host processor 2 performs general functions related to the operation of the mobile device 1, for example presenting a user interface and accepting commands from the user via that interface. Mobile device 1 may allow the user to play audio files located on the storage device 3. Processing of those audio files is performed more efficiently by DSP 4 than by the host processor 2. For DSP 4 to be able to process those files, it must access storage device 3 to retrieve the data. During that access, the host processor 2 may also require access to the storage device 3, for example to retrieve display information on the audio files on the storage device or to access other data stored on the storage device.

Figure 2:
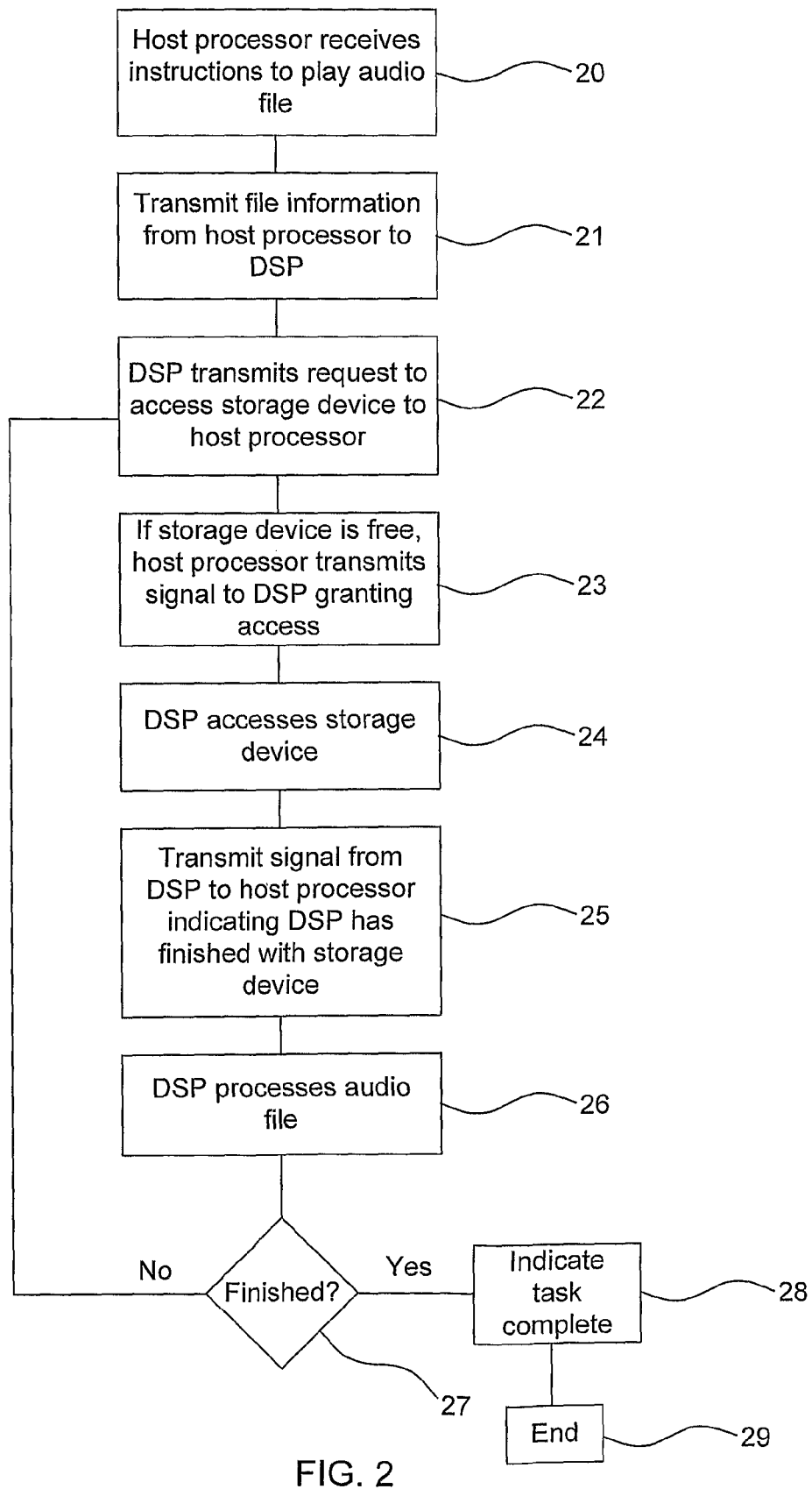
FIG. 2 is a flow chart of a method of providing shared access to a storage device interface.

FIG. 2 shows a flow chart of a method utilising the system of FIG. 1 for processing an audio file stored on the storage device 3 by DSP 4. At block 20 the host processor 2 receives instructions from the user to play a certain audio file. At block 21 the host processor 2 transmits details of the file to be played to the DSP 4 such that the DSP 4 can access and process the audio file. In order to indicate the file to be played, the host processor 2 may transmit a location in the File Allocation Table (FAT) relating to the start of the file on the memory device.

When the DSP 4 is ready to play the audio file, at block 22 the DSP 4 transmits a signal to the host processor indicating that it requires access to the storage device 3. If the host processor 2 is not currently accessing the storage device 3, at block 23 it responds with a signal indicating that the DSP 4 may access the storage device 3. If the host processor 2 is currently accessing the storage device 3 it may transmit no response until it has finished accessing the storage device 3 and then transmit the signal of block 23. Alternatively, the host processor 2 may transmit a signal indicating that it is currently accessing the storage device and that the DSP 4 should wait.

At block 24, DSP 4 requests the required data from the storage device 3 utilising conventional access techniques. The DSP 4 may only request part of the file to begin processing, and may then subsequently request further parts as processing progresses through the audio file.

Once DSP 4 has completed its access to the storage device 3, at block 25 it transmits a signal to the host processor 2 indicating that it is no longer accessing the storage device 3. The host processor is then free to access the storage device when it requires. At block 26 the DSP 4 continues to process the audio file and the host processor 2 continues normal operation. If no other functions are required by the user, some or all of the host processor 2 may sleep, thus reducing power consumption. When DSP 4 requires more of the audio file for processing, the method returns to block 22 and the DSP 4 transmits a signal to the host processor 2 that it requires access to the storage device 3. The method continues around this loop until processing is completed at blocks 27, 28, 29.

As the DSP 4 approaches the end of the audio file, or at the end of processing, it may transmit a signal to the host processor 2 indicating this, and requesting instructions (block 28). The host processor 2 may respond with details of the next audio file to process or may instruct the DSP 4 to stop processing.

The method of FIG. 2 therefore allows a mobile device 1 to play an audio file from a storage device 3 using a DSP 4 which is optimised for processing audio files, thereby reducing power consumption compared to utilising the host processor 2. The method allows both the host processor 2 and the DSP 4 to access the storage device 3 such that there is no conflict between the processors and without requiring additional hardware components to control or mediate access to the storage device. Signals with regard to access to the storage device interface may be sent directly between the host and digital signal processor. In particular the system may be implemented entirely in software or firmware.

The transfer rate required for playing an audio file is relatively low and thus the duty cycle of DSP 4 accesses to the storage device is relatively low. For example, a high quality MP3 file requires a transfer rate of approximately 400 kbps, compared to a transfer rate of up to 160 Mbps for Secure Digital (SD) memory card devices. The DSP 4 would therefore only require access to the storage device for less than 1% of time. Due to this low duty cycle it is unlikely that the host processor 2 will require access to the storage devices, while the DSP is accessing it. If both processors do attempt access at the same time the host processor 2 can wait until the DSP 4 has indicated it has finished and then access the storage device. If the host processor requires more rapid access to the storage device, and cannot wait until the DSP 4 has completed its access, then provision may be made for the host processor to indicate to the DSP that it requires access. This could be performed by the host processor 2 transmitting an 'access required' signal to the DSP 4, which would cease accessing the storage device 3 and indicate to the host processor 2 that it could access the storage device 3.

In a variation of the method of FIG. 2, the DSP does not send an indication to the host when it has finished accessing the storage device. The system assumes that the DSP has access to the storage device until the host requests access by sending a signal to the DSP. Such a system allows the host to sleep for more extended periods as it does not need to wake to receive the indication of completion from the DSP, but only needs to wake when it requires access. Other variations of this signalling are possible, for example the indication of block 25 may be omitted, but the indication at block 28 transmitted.

At the hardware level, when a processor is not accessing the storage device, it may tri-state its connections to the storage device interface, such that the communications of the other device are not affected.

The storage device 3 may be any suitable type of storage device, for example Mass Storage Devices, SD memory devices or CompactFlash memory devices.

Figure 3:
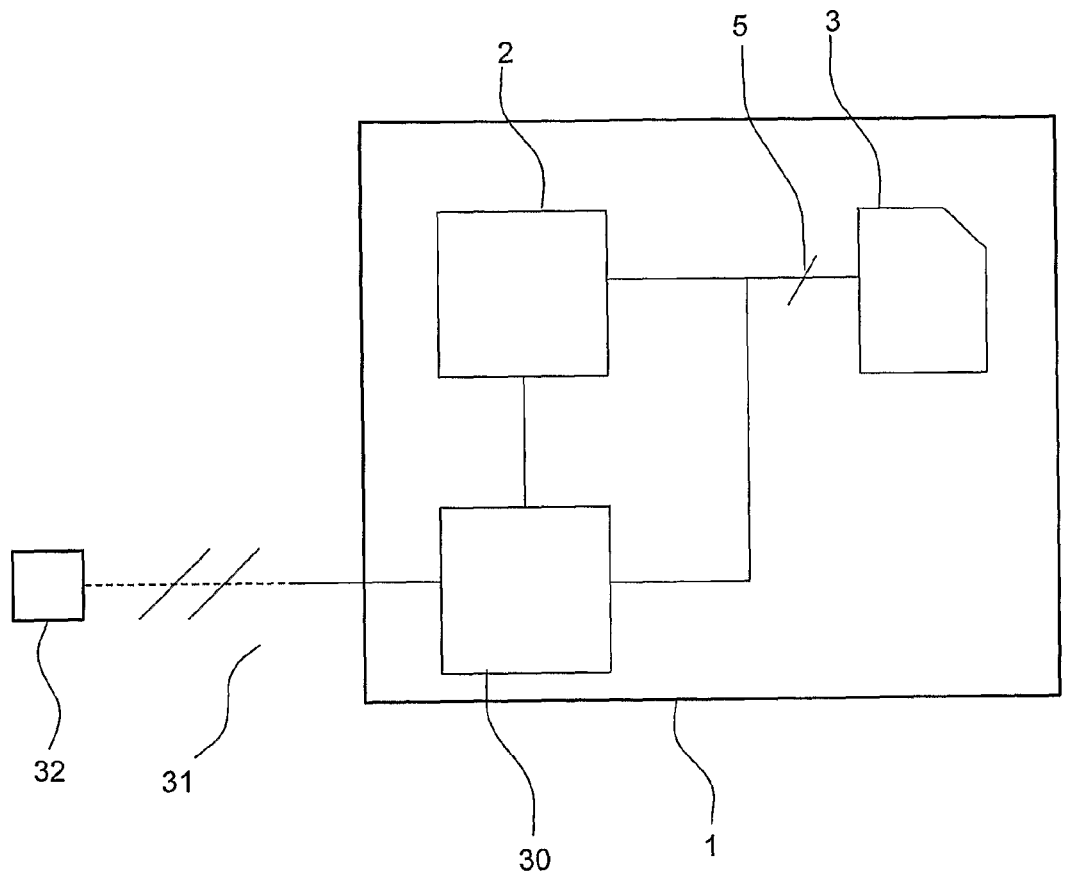
FIG. 3 is a schematic diagram of an apparatus for providing shared access to a storage device interface and a communications link to a remote device.

FIG. 3 shows a schematic diagram of a mobile device 1, comparable to that shown in FIG. 1. Like reference numerals have been used for like elements.

Connectivity device 30 is provided for establishing and utilising a communications link 31 with a remote device 32. The connectivity device is connected in the same manner as the DSP 4 in FIG. 1. The connectivity device 30 may be, for example, a Bluetooth system, for communicating with remote device 32 via a Bluetooth radio link. Alternatively communications link 31 could be a wired link with connectivity device 30 providing the necessary interface to that link to enable communication with the remote device 32. Remote device 32 may be any device that needs to transmit or receive information from the connectivity device. For example, it may be a data logging system, an audio output device or a further storage device.

Figure 4:
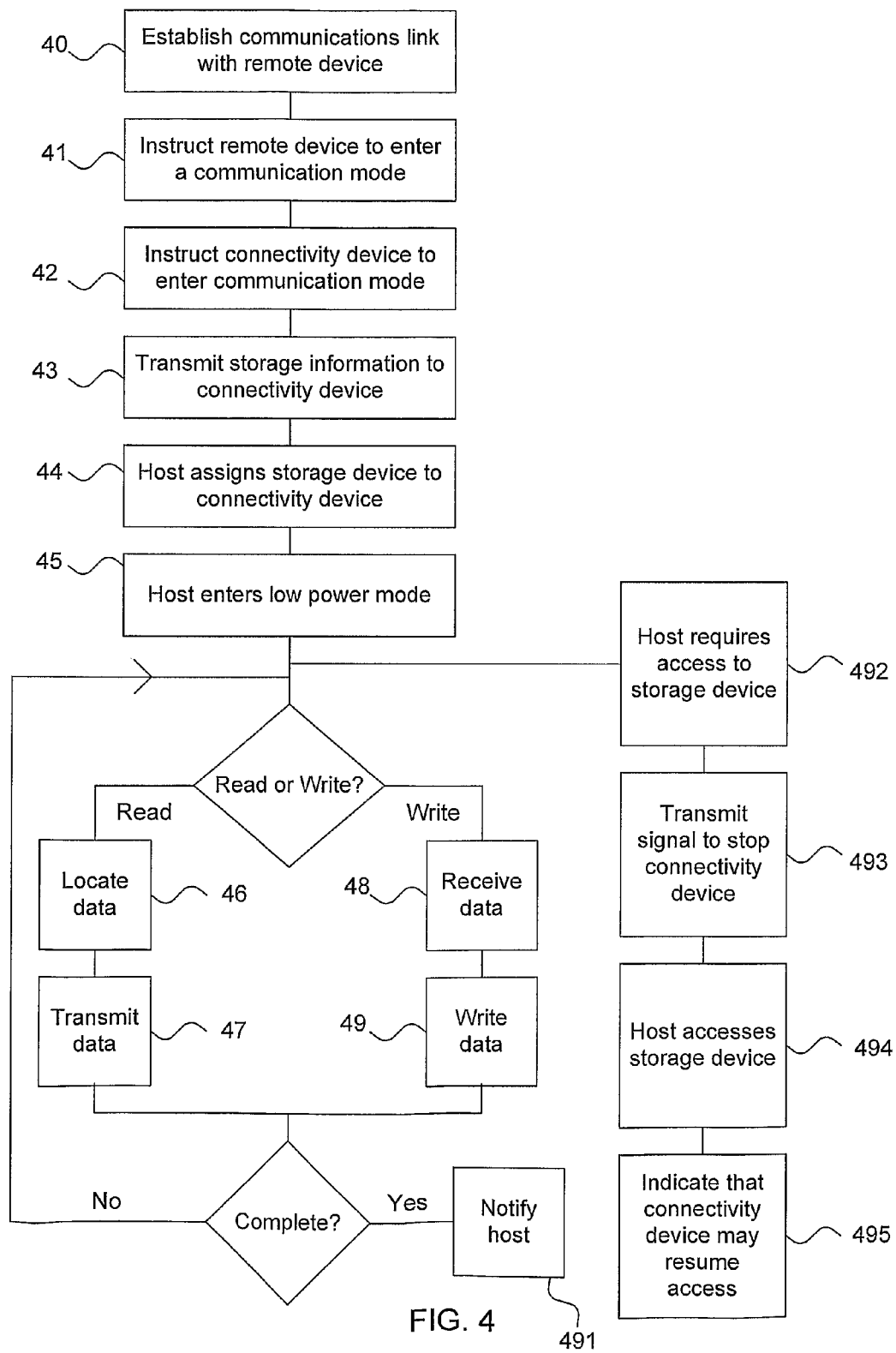
FIG. 4 is a flow chart of a method of provided access to a storage device interface and transmission or reception of data from a remote device.

FIG. 4 shows a flow chart of a method associated with the system of FIG. 3.

At block 40 the host processor 2 establishes a communications link between the connectivity device 30 and the remote device 32. At blocks 41 and 42 the host processor 2 instructs the remote device 32 and connectivity device 30 to enter a communications mode for transferring data between the remote device 32 and the mobile device 1.

At block 43 the host processor 2 transmits information to the connectivity remote device 32 with regard to the location of data, or the location at which data will be stored, in storage device 3. That location information may comprise memory address information, file handles, directories, or, any suitable information for identifying a storage location in the storage device 3.

At block 44 the host processor 2 assigns access to the storage device 3 to the connectivity device 30, as described hereinbefore and in particular in relation to the method of FIG. 2. The host processor 2 then enters a low-power mode at block 45 in which it minimises its power consumption.

If data is to be read from the storage device 3 and transferred to the remote device 32, at block 46 the connectivity device reads the data from the locations specified in block 43 and transmits it to the remote device 32 at block 47. If data is to be received from the remote device 32 and stored in storage device 3, the data is received via the communications link at block 48 and stored in the location specified in block 49.

If the data transfers have been completed the host is notified at block 491, otherwise the transmission or reception continues. If the transfer has been completed the host may wake and take other action, for example releasing the storage device 3 from the connectivity device 30, or outputting an indication that the transfer has completed.

If during the data transfer the host requires access to the storage device 3 (block 492) it transmits a message to the connectivity device 30 to cease reading or writing to that storage device (block 493). The connectivity device 30 may cease its communications with the remote device 32, or may continue using buffered data. The host performs the accesses it requires with storage device 3 (block 494) before indicating to the connectivity device 30 that it may resume access (block 495).

This method allows data to be transferred between the storage device 3 and the remote device 32, via communications link 31, while the host processor remains in a low-power state as the host is not required to allow access to the storage device.

A number of examples of applications of this method and system are described below.

The remote device 32 may comprise sensors for gathering information. For example, the device may be a GPS receiver, Heart Rate Monitor or other medical device. Bluetooth Low Energy provides a wireless mechanism to transfer the information to the mobile device 1 without consuming significant energy. Similarly the method described herein allows gathered information to be stored to the storage device 3, also using a minimum of power, while retaining the ability for the host processor 2 to access and perform processing on that data when required. A low power system that can operate for extended periods from a comparably small power source, without compromising processing ability, is therefore provided.

The remote device 32 may be an output device for outputting audio signals. For example, it may be a Bluetooth headset. Mobile device 1 may be a mobile telephone allowing the playback of encoded audio files via the remote device 32. The connectivity device 30 may include a specific audio decoding system which can efficiently decode encoded files held on the storage device 3 for transmission. The system therefore allows the decoding and playback of audio files without requiring the high power consumption host processor to be utilised.

The system and method can be utilised to improve the transfer of large amounts of data to a mobile device 1. Remote device 32 may be a computer system storing files for transfer. The communications link is established between the computer system 32 and the mobile device 1 using connectivity device 30 which facilitates data transfer and storage to the storage device. Data transfer is initiated by the host processor, but is subsequently handled without the involvement of the host. The latency of the host is therefore removed from the system and power consumption may be reduced as the host can be placed in a low power mode. The connectivity device 30 may also have access to a memory allowing the buffering of data prior to storage in the storage device since that storage step may be slower than the transfer speed.

The connectivity device may comprise video encoders to efficiently decode or transcode video data files. The mobile device can thus transcode video files stored on the storage device for transfer via the communications link, without requiring processing by the host.

The mobile device referred to above may, for example, be a mobile telephone. Furthermore the description may be applicable to non-mobile devices having the features described herein.

The host processor may be an ARM processor and the DSP may be a general purpose DSP or a specific DSP for Media Rendering. The use of the term DSP is not intended to restrict the invention to any particular form of processor, but as will be appreciated any processor capable of providing the required functions could be utilised as the processor referred to as the DSP in this description.

The mobile device may also comprise other devices to provide functionality, for example drivers for displays and keyboards, or wireless link (devices) (for example Bluetooth™) Some or all of these devices may be combined into multi-function devices. In particular, the DSP and wireless link devices may be combined into a single device, for example as in the BlueCore™ processor supplied by Cambridge Silicon Radio Ltd.

Implementation of the methods described herein within a mobile device having a combined DSP and wireless link device allows efficient processing and transmission of an audio file to a wireless listening device. Since the DSP handles both processing and transmission of audio data the host processor can sleep for substantial periods, thereby further reducing power consumption.

The methods described herein may be performed by hardware based programs, for example firmware, in the host processor and DSP, or may be performed by software based programs loaded on to those devices.

The term 'processor' is used herein to refer to any device with processing capability such that it can execute instructions. Those skilled in the art will realize that such processing capabilities are incorporated into many different devices and therefore the term 'processor' includes conventional processors, DSPs, microcontrollers and any other family of devices capable of providing the required functionality.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of sharing access to a storage device interface performed in a mobile device comprising first and second processing devices and the storage device interface, the method comprising the steps of:
    transmitting a signal from the second processing device to the first processing device indicating that the first processing device may access the storage device interface, and on receipt of the signal the first processing device accessing the storage device interface.

2. A method according to claim 1, further comprising the step of when the first processing device has completed accessing the storage device interface, transmitting a signal from the first processing device to the second processing device indicating that the second processing device may access the storage device interface.

3. A method according to claim 1, further comprising the step of transmitting a signal from the first processing device to the second processing device indicating that the first processing device requires access to the storage device interface.

4. A method according to claim 1, wherein the first processing device is a digital signal processor.

5. A method according to claim 1, wherein the second processing device is a host processor.

6. A method according to claim 1, wherein the method is performed during retrieval and playback of an encoded audio file located on a storage device connected to the storage device interface.

7. A method according to claim 1, further comprising the step of transmitting a signal from the second processing device to the first processing device indicating that the storage device interface is not currently available to the first processing device.

8. A method according to claim 1, wherein accessing comprises reading data from the storage device interface, and wherein the method further comprises the step of the first processing device transmitting the read data via a communications link to a remote device.

9. A method according to claim 8, wherein the communications link is established directly between the first processing device and the remote device.

10. A method according to claim 9, wherein the signal from the second processing device to the first processing device indicating that the first processing device may access the storage device interface comprises an instruction to the first processing device to read data from the storage device interface and transmit it via the communications link.

11. A method according to claim 10, wherein the signal from the second processing device to the first processing device indicating that the first processing device may access the storage device interface comprises an instruction to the first processing device to receive data via the communications link and to write that data to the storage device interface.

12. A method according to claim 1, wherein accessing comprises writing to the storage device interface, and wherein the method further comprises the step of the first processing device receiving data for writing to the storage device interface via a communications link to a remote device.

13. A method according to claim 1, further comprising transmitting an indication from the second processing device to the first processing device of a memory location in a storage device connected to the storage device interface which should be accessed by the first processing device.

* * * * *